United States Patent [19]

Hansen et al.

[11] Patent Number: 5,068,121
[45] Date of Patent: Nov. 26, 1991

[54] PRODUCT AND PROCESS FOR PREPARING A PLANT FIBER PRODUCT

[75] Inventors: Sven K. Hansen, Pjedsted; Anders H. Balle, Strib, both of Denmark

[73] Assignee: Fredericia Cellulose A/S, Fredericia, Denmark

[21] Appl. No.: 439,665

[22] Filed: Nov. 21, 1989

[30] Foreign Application Priority Data

Oct. 19, 1989 [NL] Netherlands .......................... 5188/89

[51] Int. Cl.$^5$ .......................... A23K 1/00; A23L 1/277
[52] U.S. Cl. .................................... 426/636; 426/425; 426/436; 426/449; 426/618; 426/626
[58] Field of Search ............... 426/439, 425, 449, 436, 426/618, 626, 636

[56] References Cited

U.S. PATENT DOCUMENTS

| | | | |
|---|---|---|---|
| 4,307,121 | 12/1981 | Thompson | 426/431 |
| 4,774,098 | 9/1988 | Gould et al. | 426/549 |
| 4,859,282 | 8/1989 | Chou et al. | 426/636 |
| 4,859,283 | 8/1989 | Jayawant | 426/636 |

OTHER PUBLICATIONS

Hawley, G., The Condensed Chemical Dictionary, 1974, Reinhold Publishing, p. 197.

*Primary Examiner*—Marianne Cintins
*Assistant Examiner*—Helen Pratt
*Attorney, Agent, or Firm*—Wegner, Cantor, Mueller & Player

[57] ABSTRACT

A plant fiber product for use in food products is prepared from straw by cutting and cooking in sodium hydroxide containing liquor, followed by a treatment with $ClO_2$ in an acid medium, treatment with $H_2O_2$ in a basic medium, and again treatment with $ClO_2$ in an acid medium, said processing steps being carried out for such a period and with such an intensity that substantially all lignin is removed, that the final product is obtained with great whiteness and purity, thereby making the product suitable for the intended purpose.

14 Claims, No Drawings

PRODUCT AND PROCESS FOR PREPARING A PLANT FIBER PRODUCT

FIELD OF THE INVENTION

The present invention deals with a process for preparing a plant fiber product, suitable as an ingredient in food products, particularly in bread and other bakery products.

During the recent decade, consumers have increasingly desired to increase the consumption of so-called dietary fibers, i.e. fibers that are not broken down by the passage through the alimentary tract. It is supposed that too small consumption of dietary fibers increases the risk of certain severe diseases, such as colon cancer and circulatory diseases. Moreover, the consumption of an increased amount of dietary fibers in substitution for calories supplied in nutritious substances expediently provides for reduced calories consumption.

The wish to increase the diet content of indigestable fibers has inspired quite a number of consumers to change their dietary habits with a view to consuming a major part of vegetables and more coarsely ground cereal products, such as bran.

It is, however, a wish of many consumers that the increased consumption of dietary fibers must be effected without changing the dietary habits and by consuming nutrients and other consumption products that do not differ materially from the usual ones.

This implies that there is a demand for products to be used as dietary fiber enriching components in the preparation of foodstuffs without substantially changing the taste, appearance and other qualities thereof.

As regards a fiber product for the above purpose it is required or desired to fulfill inter alia the following conditions:

a) A physiologically acceptable composition wherein both the chemical composition determined by the origin of the fibers is acceptable and that the product by the processing steps has not been polluted or converted in a physiologically disadvantageous manner.

b) Organoleptically satisfactory qualities including a neutral bland taste or preferably no taste at all, and the ability not to change the "mouth feel" substantially of the food products to which the fiber product is added.

c) Suitable water and fat absorption properties which are necessary in order that the fiber product may replace flour or other usual ingredients without considerably changing the character of the final food products or without substantially changing the methods of preparing the actual food products due to the application of the fiber product. Said absorption qualities are also essential to "mouth feed" as mentioned under item b).

d) A pure white color so that the substitution of the fiber product for the white flour, e.g. in breadmaking, does not entail any changes in color of the final foodstuffs.

e) The material used as starting material in the preparation of the fiber products is advantageously of the type generally associated with foodstuffs, which consumers would not consider to be risky or strange as a component of foodstuffs.

DESCRIPTION OF PRIOR ART

For the actual purpose none of the prior fiber products is capable of completely complying with the above requirements.

Cellulosic fibers originating from wood, in particular foliferous trees, are one of the materials suggested for the purpose concerned. Cellulosic wood fibers may, however, only be used in comparatively small quantities without altering the character of the foodstuffs, in particular regarding mouth feed as mentioned under item b). In order to overcome this disadvantage, it has been suggested to combine the use of cellulosic products of wood with various viscosity regulating and stabilizing substances, but such an application of subsidiary materials that are not a usual constituent of foodstuffs of the type concerned, is undesired.

In addition to this, wood cellulose does not fulfil the condition under item e).

U.S. Pat. No. 4,307,121 discloses a process for preparing a cellulosic fiber product suitable for human consumption from soybean hulls, pea shells, corn bran or beet pulp. The processing includes inter alia bleaching with $Cl_2$, such that the product may include larger amounts of chlorinated organic compounds than those considered acceptable in food products. According to claim U.S. reference the process is in practice not applicable with respect to the stem parts of plants.

U.S. Pat. No. 4,774,098 deals with the preparation of a fiber product for use in nutrients by delignification of a non-wooden lignocellulosic substrate by treatment with hydrogen peroxide at a pH-value in the range from 11.2 to 11.8. Wheat straw may inter alia be mentioned as an example of lignocellulosic substrates. An amount in the range from 40% to 60% of the original lignin content of the substrate is typically removed. A fibrous material produced from straw from which only such a small amount of the original lignin content has been removed is, however, not able to fulfil the above conditions because the lignin prevents the product from assuming a pure white color, and the lignin further causes the material to impart a somewhat "wooden" taste and mouth feel to the food products into which it is incorporated.

Finally, the published DK patent application No. 997/85 states the possibility of preparing a product suitable as dietary fibers by subjecting straw to a treatment with enzymes. The specific conditions of carrying out this treatment are not revealed, but it is supposed that said DK application also refers to a product which is only partially delignified. The fact that the product cannot be white seems to be evident.

SUMMARY OF THE INVENTION

It has now turned out that a plant fiber product which to a higher degree than any of the prior dietary fiber products fulfils the conditions outlined under items a) to e) may be prepared from straw by using a combination of a series of processing steps known per se, which are as defined below, provided the processing steps be carried through with such an effectiveness that substantially all lignin is removed.

Accordingly, the process according to the invention comprises that cereal straw after mechanical cutting and purification is subjected to the following treatments in the enumerated order:

(i) cooking in sodium hydroxide containing liquor at a positive pressure without the addition of sulphate or sulphite,
(ii) treatment with $ClO_2$ in an acid medium,
(iii) treatment with $H_2O_2$ in a basic medium,
(iv) treamtnet with $ClO_2$ in an acid medium, and
(v) drying and grinding, the treatments under items (i) to (v) being carried out for such a period and with such an intensity that substantially all lignin is removed and the final fiber product is obtained with a whiteness greater than 80 according to the Iso-standards.

The resulting plant fiber product fulfils the five conditions under items a) to e).

Due to the fact that the delignification is carried out so extensively that the fiber product is obtained with a whiteness greater than 80 according to the Iso-standards, the risk that the final product contains undesired organic chloride compounds, such as chlorinated phenols, is reduced, since the risk of forming such compounds is substantially bigger in case the final product still contains considerable amounts of lignin which, as it is well known, is composed of phenol compounds.

To enter the whiteness of the product as a measure for the intensity of treatment to be attained thus does not only serve to ensure that the final product may be used without discoloring the foodstuffs in which it is used, but to the same extent it also serves to ensure that the product does not contain dangerous components injurious to health that are being created during the treatment with $ClO_2$.

Moreover, the extensive removal of lignin reflected by the great whiteness is desired in respect of the organoleptic qualities of the material, as explained in the following.

Irrespective of anything else, the treatment with $ClO_2$ gives rise to the formation of a considerably smaller amount of chlorinated organic compounds compared to a similar treatment with $Cl_2$. In combination with the remaining measures it further ensures an effective removal of the components of the straw which are not cellulose or hemicellulose (pentosanes).

It is thus a substantially characteristic feature of the invention that by performing a very exhaustive removal of the components that are not cellulose or hemicellulose and thereby removing substances potentially prone to form undesired chlorinated compounds, and by using a treatment which per se has only a slight tendency to create compounds injurious to health, a final product is obtained which, without involving any risk, may e used for human consumption.

The material prepared according to the invention has been subjected to extensive analyses. Among them, a particular interest attaches to the determination of tetrachloro-p-dibenzo-dioxines and -furanes, frequently defined under the same "dioxines" which, due to their high toxicity, are feared for.

Said analyses discovered that the compounds 2,3,7,8-tetrachloro-p-dibenzo-dioxine and the corresponding furane compound were present in such small amounts that they could not be detected while the total tetrachloro-dibenzo-dioxine-content was found to be 0.545 ppt (part per trillion) and the total tetrachloro-p-dibenzo-furane-content was found to be 0.324 ppt.

A content of no greater than 20 ppt of said compounds is generally considered to be acceptable.

HPLC-analysis could not detect the presence of chlorinated phenols.

An analysis of a typical product prepared from wheat straw by using the process according to the invention yielded the following results;

Ash: 1.34% determined on solids
Cellulose content: 72.1% determined on solids
Pentosane content: 25.7% determined on solids
Kappa number < 1.

From the above the content of lignin may be calculated to amount to less than 0.15% based on solids.

The above determination of the pentosane content illustrates that this is considerably higher than what applies to cellulose produced from wood. Said larger content of pentosane is associated with the improved moisture absorption properties and organoleptic properties of the material prepared by the process according to the invention, compared to cellulose based on wood.

A preferred embodiment of the process according to the invention comprises using wheat straw as cereal straw, since consumers more easily accept a product resulting therefrom as a component of foodstuffs, especially when the food product is based on wheat flour. Besides, the process according to the invention has been particularly tested in connection with wheat straw.

The product produced by the process is presented as a white powder which can be marketed as such or which may conveniently be marketed as a component of a mixture comprising other components used, for instance, in connection with breadmaking. Thus, the invention also relates to a flour containing mixture, in particular for use in the preparation of white bread, said mixture containing besides flour and ordinary adjuvants a plant fiber product, prepared according to the invention.

The invention will now be illustrated in detail by the following Example:

EXAMPLE

The process was carried out by use of an industrial plant developed for preparing cellulose for paper manufacture.

After having been cut into pieces of several centimeters in size the wheat straw was wind-sorted for the removal of grains and dust and subsequently combined with a cooking liquor based on sodium hydroxide but without the sulphite or sulphate components generally occurring in many cellulose processings.

The mixture of straw and liquor was subjected to cooking at about 160° C. for 2½ hours and the fiber mass now substantially disintegrated was subjected to counterflow washing and vibration screening to remove undissolved particles and impurities.

The resulting fiber suspension was pumped through a hydrocyclone plant to remove sand, subsequently transferring to a so-called bleaching tower in which the pH-value was adjusted to about 3.5 with sulphuric acid, following which $ClO_2$ was supplied to the bottom of the bleaching tower. The temperature during this processing step was about 45° C. and the processing period lasted about 1 hour.

The fiber means was then washed and suspended in an aqueous NaOH-solution, following which $H_2O_2$ was added. During this processing step the pH-value was approximately 11 and the temperature in the range of 70° C. and the duration of the treatment was 1½ hours.

The fiber mass was again washed and subsequently again subjected to a treatment with $ClO_2$ in an acid medium under the same conditions as used for the first $ClO_2$ treatment, the temperature, however, was raised to 85° C. and the treatment lasted about 4 hours.

After washing, the fiber mass was dehydrated to form a pulp sheet which was dried and ground to obtain a fiber powder. Said fiber powder had a whiteness of 83, determined according to the Iso-standard.

Baking tests showed that said fiber powder was capable of replacing up to 50% of the wheat flour in white bread and it was impossible to distinguish the final loaves from loaves without the addition of fiber product. This applies both as regards look, taste and mouth feel.

What is claimed:

1. A process for preparing a fiber-containing food additive from a cereal straw containing lignin, said process consisting essentially of subjected a product obtained from cutting and purifying said cereal straw to the following successive treatment steps:
   (i) cooking the product in a liquor containing sodium hydroxide at a positive pressure and without the addition of a sulphate or a sulphite;
   (ii) treating the product with $ClO_2$ in an acid medium;
   (iii) treating the product with $H_2O_2$ in a basic medium;
   (iv) treating the product with $ClO_2$ in an acid medium; and
   (v) drying and grinding the product to obtain said food additive,
whereby substantially all lignin is removed from said product, and said food additive has a whiteness greater than 80 according to the Iso-standard.

2. The process of claim 1, wherein said cereal straw comprises wheat straw.

3. A flour mixture comprising the fiber-containing food additive prepared by the method according to claim 2.

4. The flour mixture of claim 3, wherein said flour mixture is a white bread flour mixture.

5. A flour mixture comprising the fiber-containing food additive prepared by the method according to claim 1.

6. The flour mixture of claim 5, wherein said flour mixture is a white bread flour mixture.

7. A foodstuff comprising a fiber-containing food additive prepared from a cereal straw containing lignin by a method consisting essentially of subjecting a product obtained from cutting and purifying said cereal straw to the following successive treatment steps:
   (i) cooking the product in a liquor containing sodium hydroxide at a positive pressure and without the addition of a sulphate or a sulphite;
   (ii) treating the product with $ClO_2$ in an acid medium;
   (iii) treating the product with $H_2O_2$ in a basic medium;
   (iv) treating the product with $ClO_2$ in an acid medium; and
   (v) drying and grinding the product to obtain said food additive,
whereby substantially all lignin is removed from said product, and said food additive has a whiteness greater than 80 according to the Iso-standard.

8. The foodstuff of claim 7, wherein said fiber-containing food additive is incorporated into dough for white bread.

9. The foodstuff of claim 7, wherein said cereal straw comprises wheat straw.

10. The foodstuff of claim 9, wherein said fiber-containing food additive is incorporated into dough for white bread.

11. In a bakery product prepared from dough comprising a flour mixture, the improvement wherein said flour mixture comprising 5 to 50% by weight of a fiber-food additive based on total weight of flour prepared from a cereal straw containing lignin by a method consisting essentially of subjecting a product obtained from cutting and purifying said cereal straw to the following successive treatment steps:
   (i) cooking the product in a liquor containing sodium hydroxide at a positive pressure and without the addition of a sulphate or a sulphite;
   (ii) treating the product with $ClO_2$ in an acid medium;
   (iii) treating the product with $H_2O_2$ in a basic medium;
   (iv) treating the product with $ClO_2$ in an acid medium; and
   (v) drying and grinding the product to obtain said food additive,
whereby substantially all lignin is removed from said product, and said food additive has a whiteness greater than 80 according to the Iso-standard.

12. The bakery product of claim 10, wherein said bakery product is white bread.

13. The bakery product of claim 11, wherein said cereal straw comprises wheat straw.

14. The bakery product of claim 13, wherein said bakery product is white bread.

* * * * *